United States Patent
Dobtchev

(10) Patent No.: US 7,620,727 B2
(45) Date of Patent: Nov. 17, 2009

(54) METHOD AND SYSTEM FOR MANAGEMENT PROTOCOL-BASED DATA STREAMING

(75) Inventor: Hristo I. Dobtchev, Sofia (BG)

(73) Assignee: SAP (AG), Walldorf (DE)

( * ) Notice: Subject to any disclaimer, the term of this patent is extended or adjusted under 35 U.S.C. 154(b) by 273 days.

(21) Appl. No.: 11/529,991

(22) Filed: Sep. 29, 2006

(65) Prior Publication Data

US 2008/0082679 A1    Apr. 3, 2008

(51) Int. Cl.
 *G06F 15/16* (2006.01)
(52) U.S. Cl. .......................................... 709/231; 726/27
(58) Field of Classification Search ......... 709/230–231, 709/203, 217, 246; 726/26–27
See application file for complete search history.

(56) References Cited

U.S. PATENT DOCUMENTS

| | | | |
|---|---|---|---|
| 6,886,029 B1* | 4/2005 | Pecus et al. | 709/203 |
| 6,910,078 B1* | 6/2005 | Raman et al. | 709/231 |
| 2004/0019801 A1* | 1/2004 | Lindholm et al. | 713/200 |
| 2005/0273467 A1* | 12/2005 | Gardner | 707/100 |
| 2007/0153916 A1* | 7/2007 | Demircin et al. | 375/240.26 |
| 2008/0140832 A1* | 6/2008 | Brauneis et al. | 709/224 |

* cited by examiner

*Primary Examiner*—Salad Abdullahi
(74) *Attorney, Agent, or Firm*—Blakely, Sokoloff, Taylor & Zafman, LLP

(57) ABSTRACT

A method for performing data streaming using a management protocol. In one embodiment, the method includes receiving a request of contents of a file at a first system from a second system, the file is associated with the first system, reading contents of the file at the first system, in response to the request, and streaming the contents of the file to the second system, wherein the streaming of the contents is based on a management protocol.

9 Claims, 9 Drawing Sheets

METHOD AND SYSTEM FOR MANAGEMENT PROTOCOL-BASED DATA STREAMING

FIELD

Embodiments of the invention generally relate to the field of data transferring. More particularly, the embodiments of the invention relate to performing data streaming using a management protocol.

BACKGROUND

As application development projects are growing larger, transferring of data is becoming increasingly important. Transferring of large data from large files is particularly cumbersome. Furthermore, none of the conventional data transfer tools provide for transferring of data using management protocols. Management protocols (e.g., Java Management Extensions (JMX) protocol) are primarily to provide providers with the ability to add monitoring and management functions to their applications (e.g., Java applications). For example, a JMX application programming interface (API) allow local and remote management of Java-enabled properties, such as web servers, network devices, web phones, etc.

When using JMX technology, any application, device, or service residing at a machine can be controlled remotely though the use of custom JavaBeans, such as Managed Beans (MBeans). An MBean is registered in a core-management object server (e.g., MBean server). An MBean server acts as a management agent to any remote managers that are to access the machine. There several types of MBeans are defined by JMX, such MBeans include: standard MBean, dynamic MBean, model MBean, and open MBean. Standard MBeans provide management interfaces that are described by their method names. A dynamic MBean implements its management interface programmatically with the javax.management. A model MBean is a generic, configurable MBean that applications can use to instrument any machine dynamically. An open MBean is a dynamic MBean with specific constraints on its data types to allow management applications and their administrators to know and use new managed objects as they are discovered at runtime.

SUMMARY

According to one embodiment, a method for performing data streaming using a management protocol. The method includes receiving a request of contents of a file at a first system from a second system, the file is associated with the first system, reading contents of the file at the first system, in response to the request, and streaming the contents of the file to the second system, wherein the streaming of the contents is based on a management protocol.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
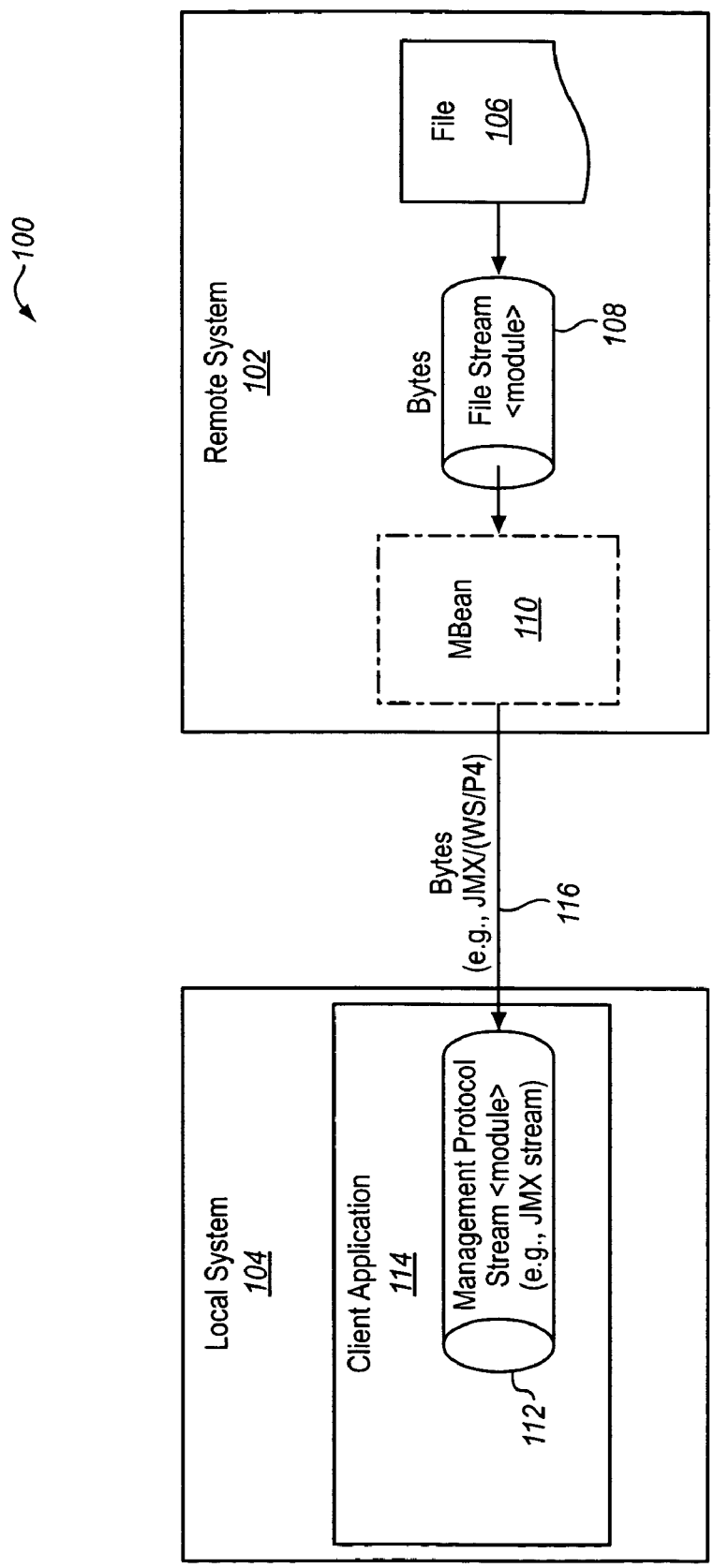
FIG. 1 illustrates an embodiment of data streaming using a management protocol

FIG. 1 illustrates an embodiment of data streaming using a management protocol. In one embodiment, data streaming of file 106 is provided between computer systems 102, 104 using a management protocol stream 112. Remote system 102 (e.g., server system) accesses file 106 that contains data that is requested by and is to be streamed to system 104 (e.g., client system). File 106 is regarded as a large file (e.g., containing 10 gigabytes of data) and thus may require a large memory to transfer to system 104. To solve this, the contents of file 106 are read in small portions and streamed onto system 104 is small portions or number of bytes 116. Similarly, the contents of file 106 are received and written in small portions at system 104.

File 106 (which may reside at system 102 or at another system) is accessed and read by system 102 via input file stream 108. As the contents of file 106 are read, they are transmitted via MBean 110 to system 104 over a network (e.g., Internet). Bytes 116 (e.g., 1-2 MB) of the contents of file 106 (e.g., having 10 GB of contents) are streamed to system 104, where they are received via management protocol stream 112 (e.g., JMX stream) that is generated via a management protocol stream module that is employed at system 104. Management protocol stream module is management protocol-based (e.g., JMX-based) and may be part of a client application 114 at system 104. Having this management protocol stream 112 allows system 104 to receive and read the contents of file 106 being streamed from system 102.

In one embodiment, the management protocol stream module using the management protocol (e.g., JMX) to act as a data carrier to provide management protocol stream 112 to receive large data files 106. For example, large data transfer are to be transferred via a JMX protocol as WebDynpro models are JMX-based and can be used over HyerText Transfer Protocol (HTTP) with Simple Object Access Protocol (SOAP) as in Web services. It is convenient and practical to use the same basic technology (e.g., JMX) when transferring data, particularly large data.

System 102 registers an MBean, such as MBean 110 or another MBean, which provides functionalities that can be used to open a stream of contents on system 102 and then MBean 110 helps transfer the streaming data using a byte array 116. A library at system 104 may provide access to that data via an API that extents the input stream class which allows standard access to the streaming data from system 102. This technique allows for opening of streams to remote file systems 102 and transferring data from such systems 102 to local systems 104 using a management protocol as a carrier of data stream. For example, a JMX protocol 112 can be serialized into Web services which allows safe access (e.g., penetrating firewalls) to streaming data of remote systems 102.

Figure 2:
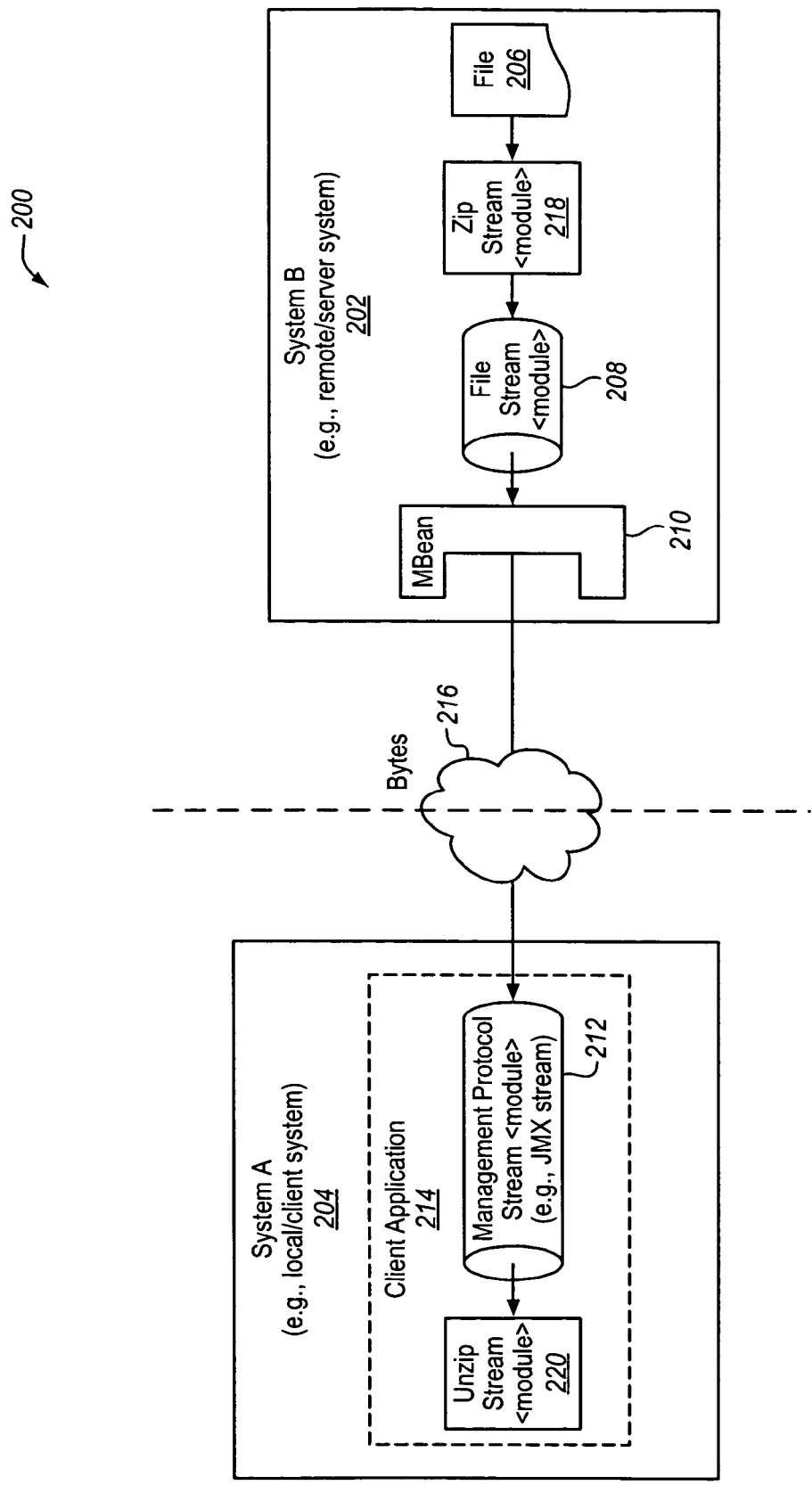
FIG. 2 illustrates an embodiment of data streaming using a management protocol.

FIG. 2 illustrates an embodiment of data streaming using a management protocol. In one embodiment, data stream for contents of file 206 are streamed from system 202 (e.g., server system) to system 204 (e.g., client system) via management protocol stream 212 using a management protocol stream module that is management protocol-based (e.g., JMX-based) as further described with reference to FIG. 1. In the illustrated embodiment, zip stream 218 is provided to zip the contents of file 206 to make the data streaming even more space and memory efficient. In one embodiment, a zipping module is employed at system 202 to zip the contents of file 206 that are then streamed via an MBean 210 to system 204 over a network. An unzipping module may be employed at system 204 to unzip the contents streamed from system 202 and received and read at system 204 via management protocol stream (e.g., JMX stream) using a management protocol as the data carrier. It is contemplated that the components and modules and their functions and locations are merely illustrated here as examples and that they can be added or removed or moved as necessary or desired. For example, management protocol stream 212 and unzip stream 214 may not be employed as part of client application 214 and may be placed to work in any given order.

Figure 3:
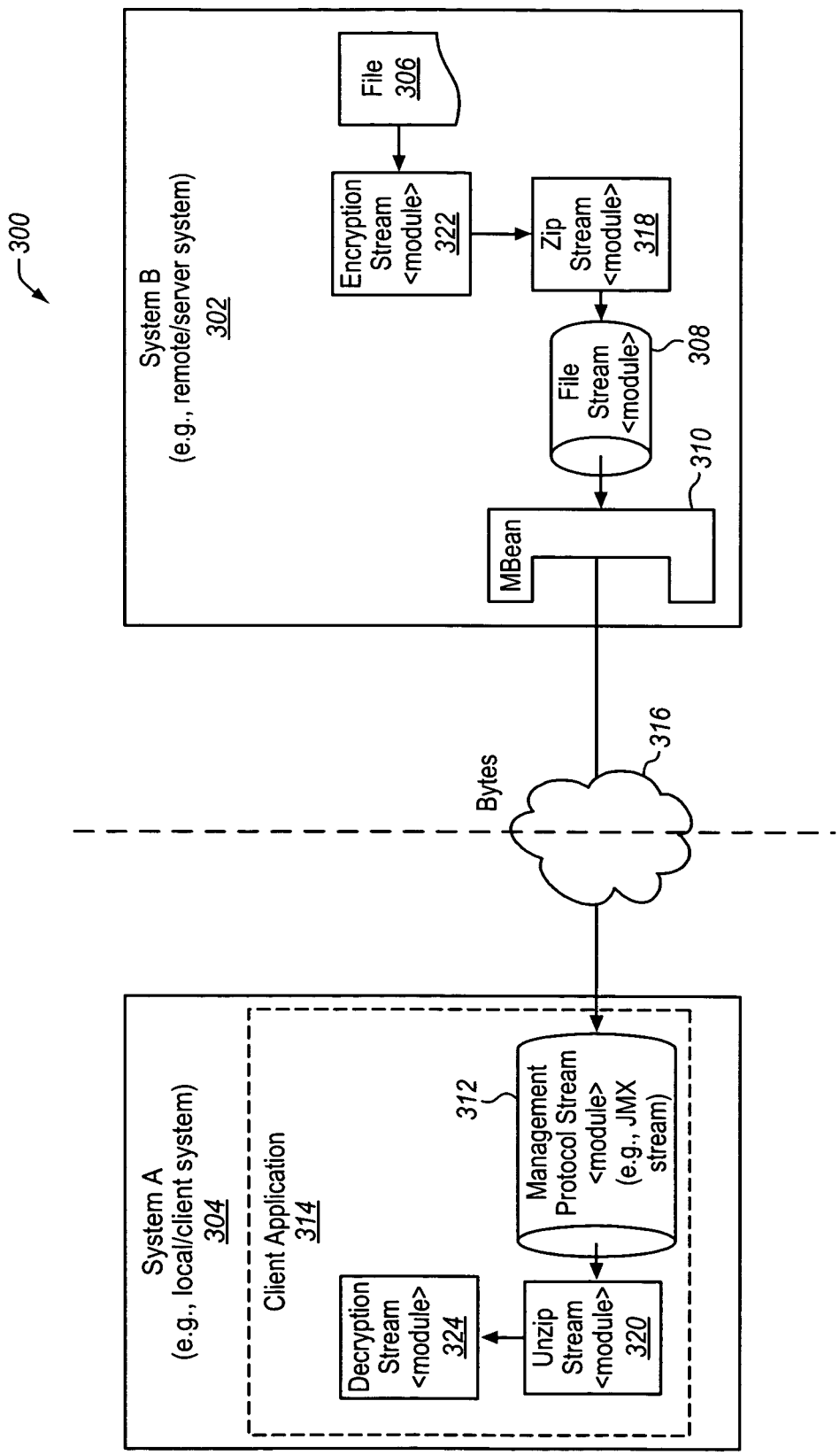
FIG. 3 illustrates an embodiment of data streaming using a management protocol.

FIG. 3 illustrates an embodiment of data streaming using a management protocol. In addition to the features described with reference to FIGS. 1-2, the illustrated embodiment provides encryption and decryption of data. In the illustrated embodiment, the contents of file 306 are encrypted using an encryption module at system 302 to provide an encryption stream 322 of the contents that are zip streamed 318 and the file streamed 308 onto system 304. It is contemplated that the contents of file 306 may not be zipped or even encrypted. In the illustrated embodiment, an encrypted and zipped stream of data is received at system 304 as management protocol stream and further as unzipped stream 328 and decryption stream 324. The decryption of the data stream is provided via a decryption module that is employed at system 304. It is contemplated that the components and modules and their functions and locations are merely illustrated here as examples and that they can be added or removed or moved as necessary or desired. For example, not both the encryption and zipping of the data may be necessary or desired and, if necessary or desired, could be performed in any particular order.

Figure 4A:
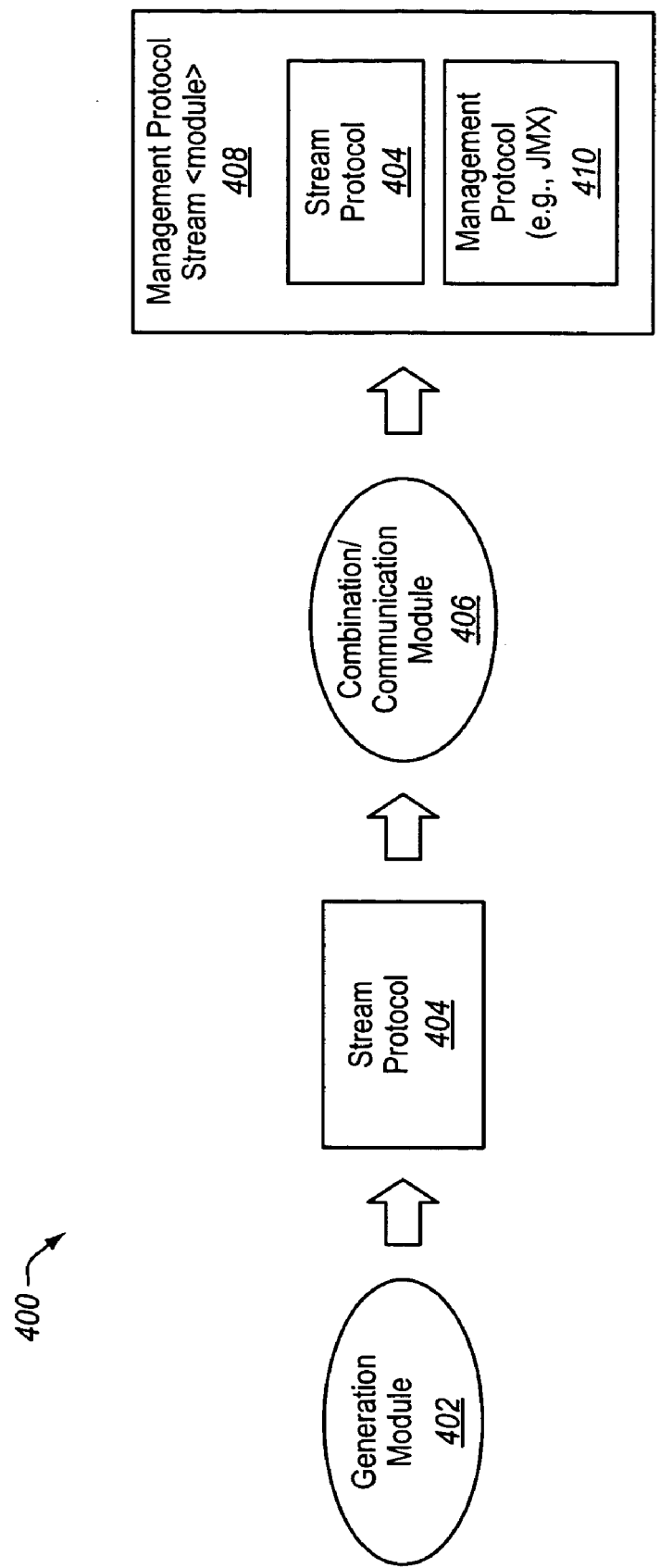
FIG. 4A illustrates an embodiment of a mechanism for generating a management protocol stream module.

FIG. 4A illustrates an embodiment of a mechanism 400 for generating a management protocol stream module 408. In one embodiment, a generation module 402 is used to generate a stream protocol 404 that is used for data streaming. A management protocol 410 (e.g., JMX) is obtained. A combination/communication module 406 is used to combine and communicate the streaming module 404 with the management protocol 410 to provide a management protocol stream module 408. The management protocol stream module 408 may be employed at a system to use the management protocol 408 as a data carrier to carry and receive the streaming data of files from other systems.

Figure 4B:
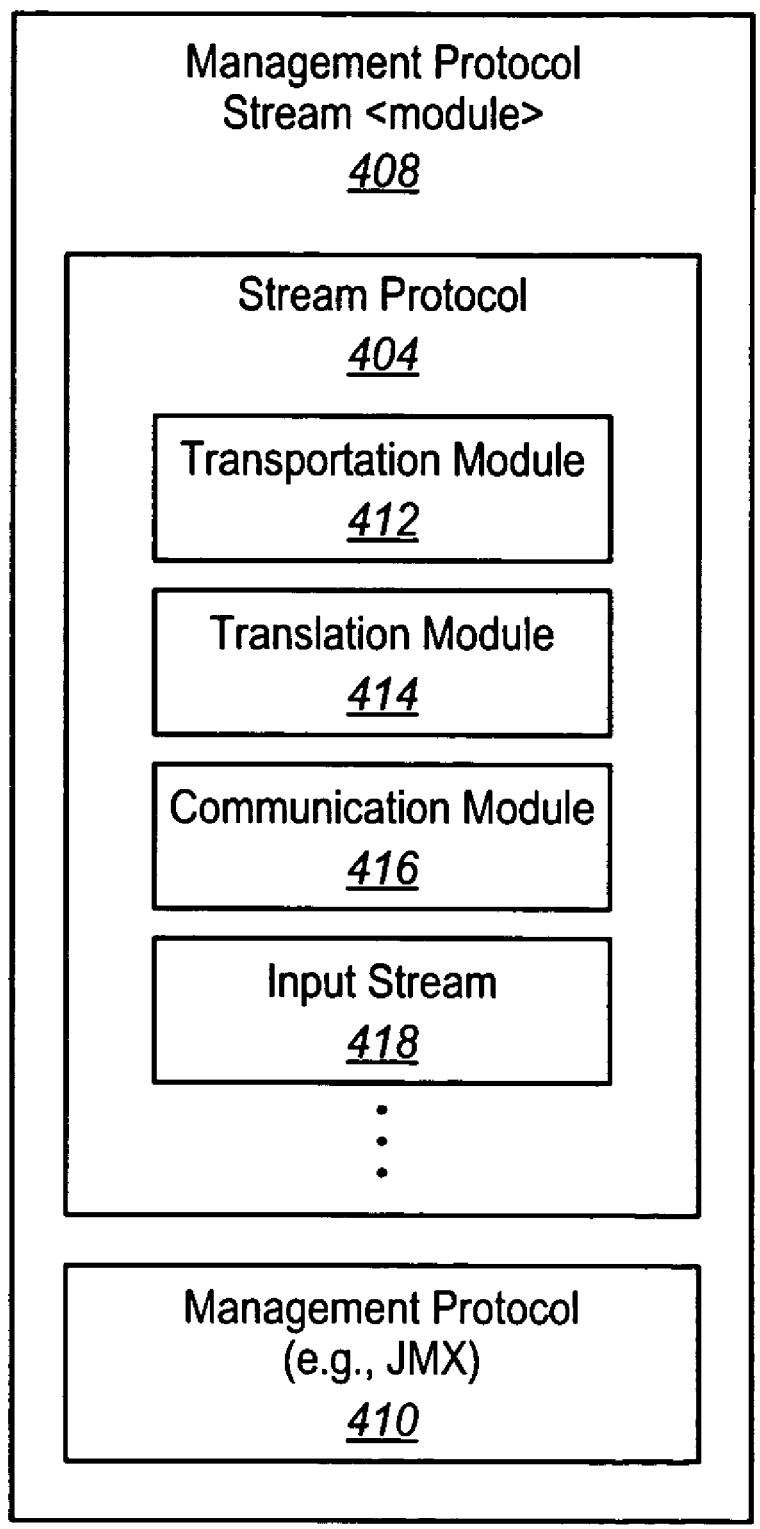
FIG. 4B illustrates an embodiment of a management protocol stream module.

Referring now to FIG. 4B, it illustrates an embodiment of a management protocol stream module 408. The illustrated management stream module 408 includes a management protocol 410 and a stream protocol 404 that further includes various components and modules. As illustrated, the stream module 404 includes a transportation module 412, translation module 414, communication module 416, input stream module 418, etc. These modules and components 412-418 are to perform various functionalities to perform management protocol-based streaming of data between systems.

Figure 5:
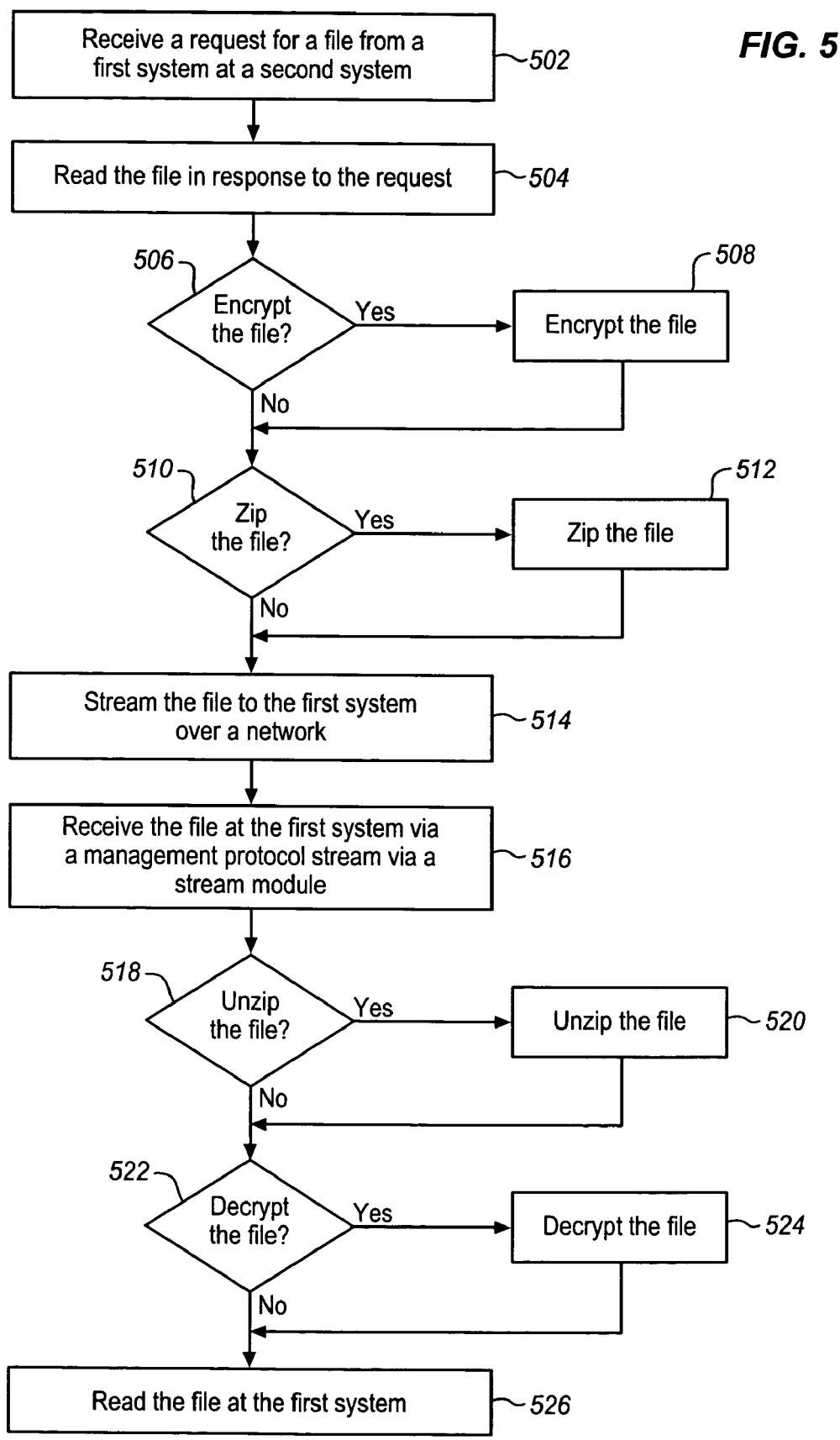
FIG. 5 illustrates an embodiment of a process for data streaming between systems using a management protocol.

FIG. 5 illustrates an embodiment of a process for data streaming between systems using a management protocol. At processing block 502, a request for a file is received from a first system (e.g., client system, local system, etc.) to a second system (e.g., server system, remote system, etc.). In response to the request, the file is accessed by the second system and contents of the file are read using a reading module. At decision block 506, a determination is made as to whether the contents of the file are to be encrypted. If yes, the contents are encrypted using an encryption module at processing block 508. If not, or once the encryption is performed, the process continues with decision block 510 with whether the file is to be zipped. If yes, the contents of the file are zipped at processing block 512. If not, or once the zipping is performed, the process continues with streaming of the file contents to the first system over a network via a file stream using an MBean at processing block 514.

At processing block 516, the file contents are received at the first system via a management protocol stream (e.g., JMX stream) using a management protocol stream module (e.g., JMX stream module) that is management protocol-based as it uses the management protocol (e.g., JMX) as a data carrier to carry the file contents. At decision block 518, a determination is made as to whether the file contents are to be unzipped. If previously zipped at the second system, the contents are unzipped at the first system using an unzipping module residing at the first system at processing block 520. If the contents are not to be unzipped, or once the unzipping is performed, the process continues with decision block 522 with determining whether the file contents are to be decrypted. If yes, the contents are decrypted at processing block 524 using a decrypting module. If not, or if the decryption is already performed, the process continues with reading of the file at the first system using a reading module residing at the first module at processing block 526.

Figure 6:
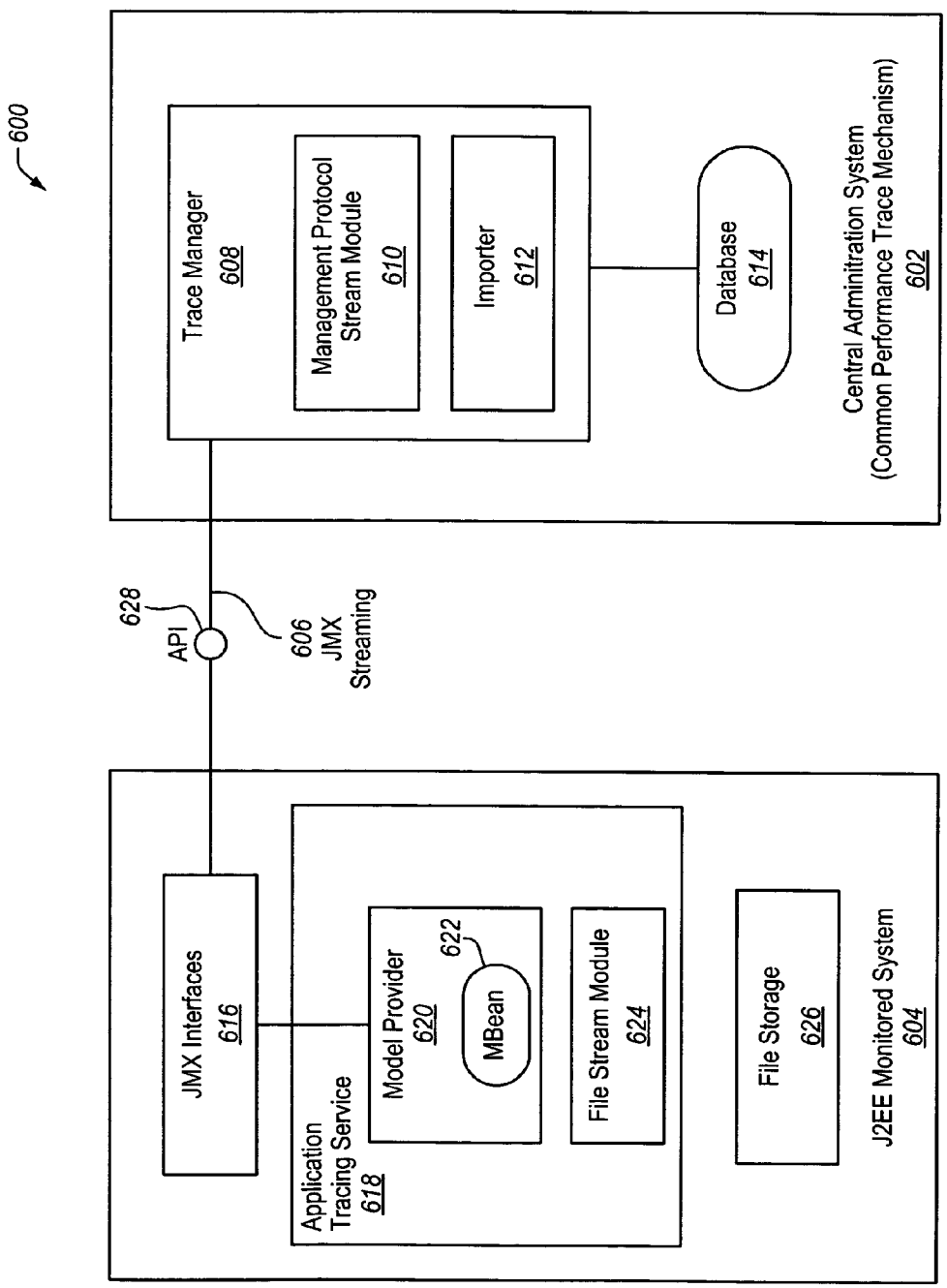
FIG. 6 illustrates an embodiment of a tracing mechanism using management protocol-based data streaming.

FIG. 6 illustrates an embodiment of a tracing mechanism using management protocol-based data streaming. In the illustrated embodiment, central administration system includes trace manager 608 and database 614. Trace manager 608 further includes importer 612 to import data from a monitored system 604 (e.g., J2EE monitored system). In one embodiment, trace manager 608 at system 602 may further include manager protocol stream module (e.g., JMX stream module) to receive a JMX streaming 606 of data from system 604. System 604 may include application tracing service 618, which further includes module provider 620 and file stream module 624 to provide JMX streaming 606 of data from system 604 to system 602 via MBean 622. System 604 further includes file storage 626 to store the data 626 that is then JMX streamed 606 over to system 602. In one embodiment, the data may be streamed from system 602 to system 604, in which case various modules may be added, removed, or moved. For example, system 604 may include a management protocol system module, while system 602 may contain a file system module. In the illustrated embodiment, system 602 provides a common performance trace format for the trace data received from various systems where tracing is being performed, such as J2EE system 604, Advanced Business Application Programming (ABAP) system, and the like.

In one embodiment, to perform various embodiments of the present invention, a server or node (e.g., J2EE server) is employed, which supports Enterprise Java Bean (EJB) components and EJB containers (at the business layer) and Servlets and Java Server Pages (JSP) (at the presentation layer). A virtual machine (VM), including a Java virtual machine (JVM), may be employed to host the server or server node. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules within or associated with an enhanced configuration architecture (such as management protocol-based data streaming mechanism 100 of FIG. 1) and its sub-architectures and systems (e.g., systems 102, 104), APIs (e.g., CPT API), and its modules, models, components, and other elements may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 7:
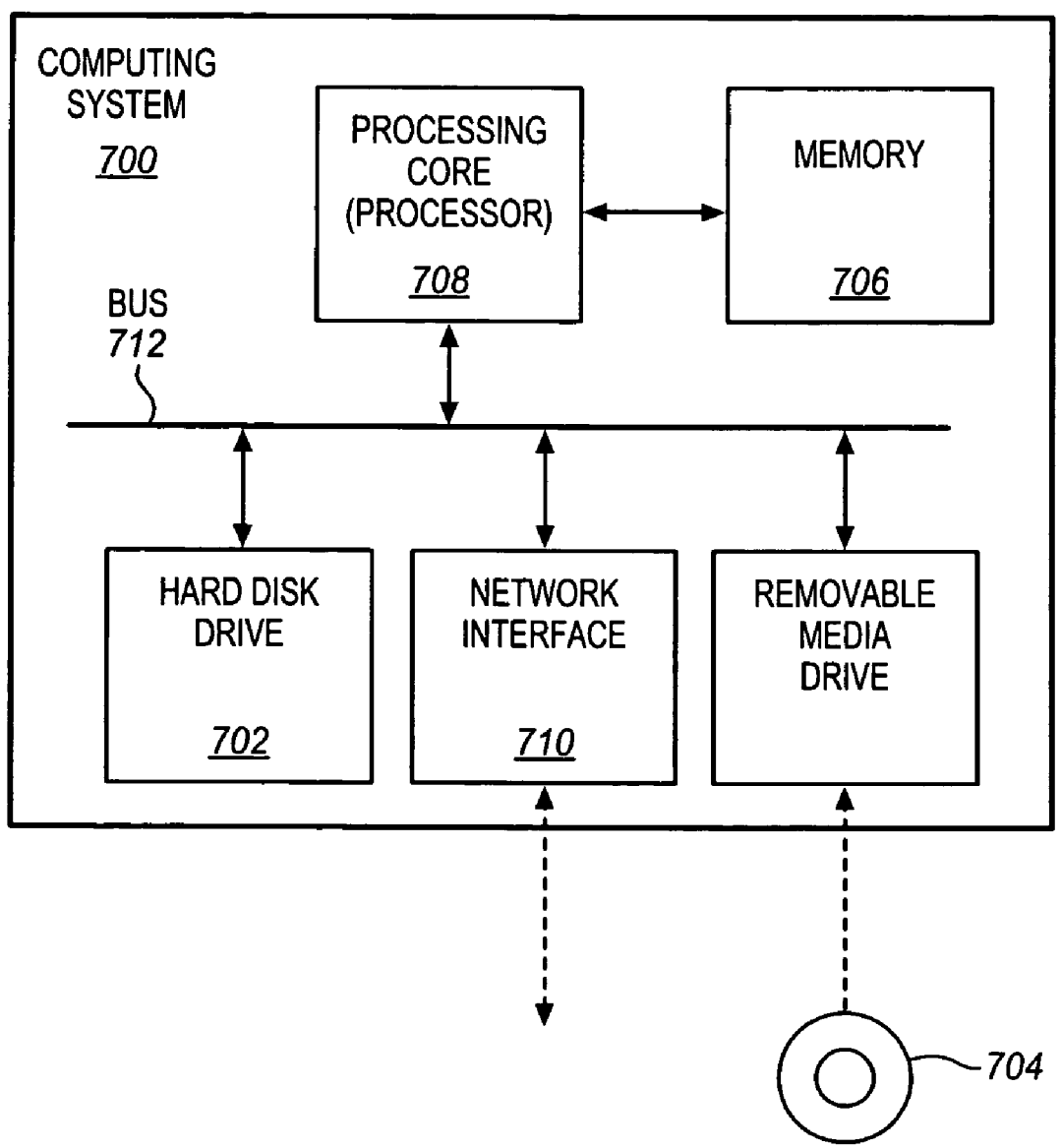
FIG. 7 illustrates a computing system.

FIG. 7 illustrates a computing system 700. Computing system 700 may be used for implementing one or more embodiments of the present invention and for executing program code stored by an article of manufacture. It is important to recognize that the computing system 700 represents merely of various computing system architectures that can be used for the same purposes. The applicable article of manufacture may include one or more fixed components (such as hard disk drive 702 or memory 706) and/or various movable components, such as compact disk (CD) ROM 704, a compact disc, a magnetic tape, and the like. To execute the program code, typically instructions of the program code are loaded into RAM 706. Then, processing core 708 executes the instructions. A processing core may include one or more processors and a memory controller function. A virtual machine or "interpreter" (e.g., a JVM) may run on top of the processing core (architecturally speaking) to convert abstract code (e.g., Java bytecode) into instructions that are understandable to the specific processor(s) of processing core 708. Computing system 700 further includes network interface 710 and bus 712 to connect to other systems via a network and to have various components communicate with each other, respectively.

Figure 8:
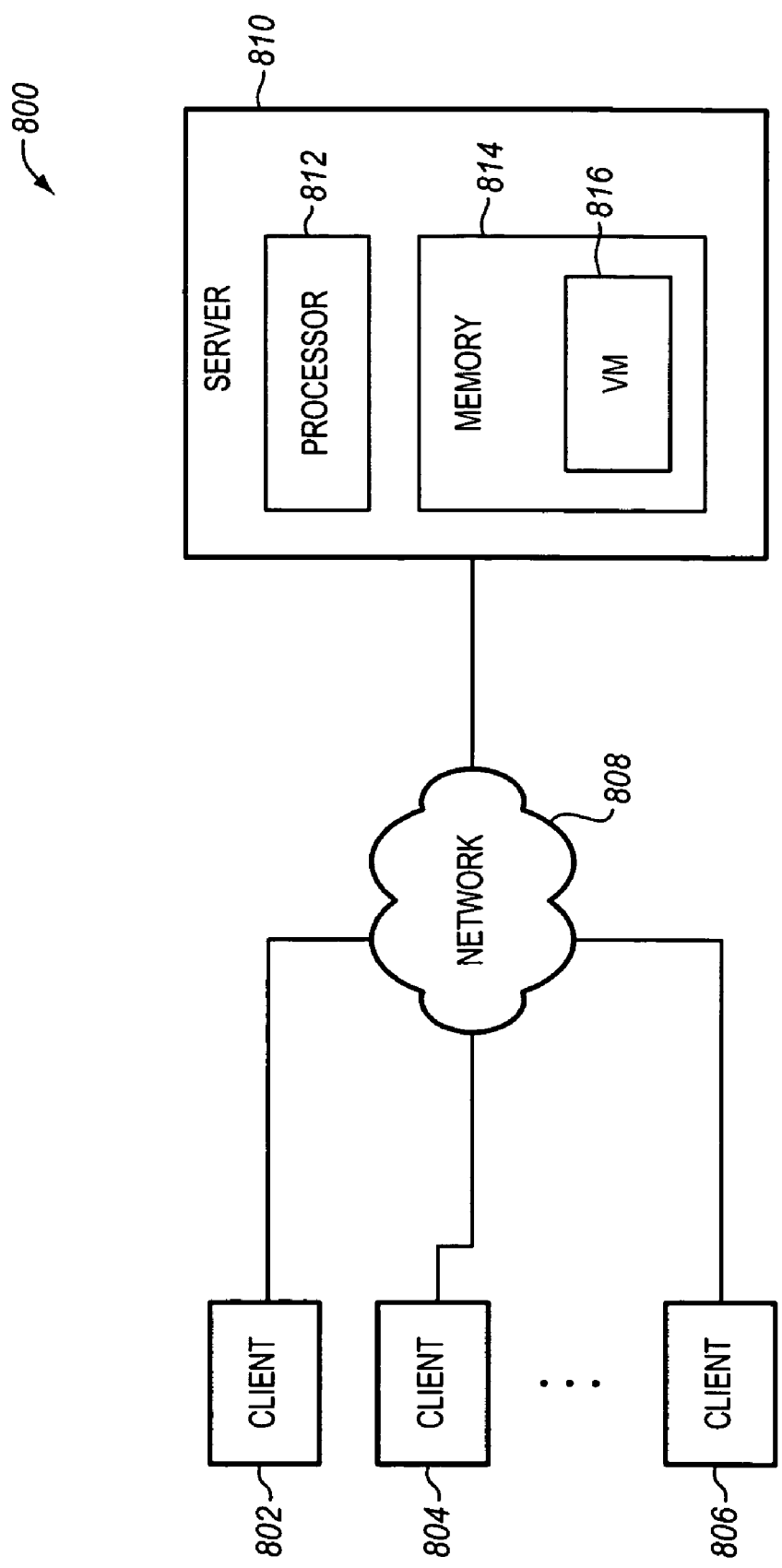
FIG. 8 illustrates a client/server network system.

FIG. 8 illustrates a client/server network system 800. As illustrated, network 808 links server 810 with client systems 802-806. Server 810 includes programming data processing system suitable for implementing apparatus, programs, and/or methods in accordance with one or more embodiments of the present invention. Server 810 includes processor 812 and memory 814. Server 810 provides a core operating environment for one or more runtime systems (e.g., VM 816) at memory 814 to process user requests. Memory 814 may include a shared memory area that is accessible by multiple operating system processes executing in server 810. For example, VM 816 may include an enterprise server (e.g., a J2EE-compatible server or node, Web Application Server developed by SAP AG, WebSphere Application Server developed by IBM Corp. of Armonk, N.Y., and the like). Memory 814 can be used to store an operating system, a Transmission Control Protocol/Internet Protocol (TCP/IP) stack for communicating over network 808, and machine executable instructions executed by processor 812. In some embodiments, server 810 may include multiple processors, each of which can be used to execute machine executable instructions.

Client systems 802-806 may execute multiple application or application interfaces. Each instance or application or application interface may constitute a user session. Each user session may generate one or more requests to be processed by server 810. The requests may include instructions or code to be executed on a runtime system, such as VM 816, on server 810 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

receiving a request for contents of a file included on a server;

reading the contents of the file at the server, in response to the request;

encrypting the contents of the file included on the server to generate an encrypted stream including the encrypted contents, the server operatively coupled to a client and to further include a management agent to provide the client access to the server via a management protocol, the client to further include an application, wherein the management protocol comprises a JAVA Management Extensions (JMX) protocol;

providing the encrypted stream to the management agent;

generating a management protocol-based stream of the contents capable of being transmitted from the server to the client; and streaming the encrypted stream from the server to the client via the management agent to provide access to the contents of the file for the application of the client, the client to receive the encrypted stream as the management protocol-based streams.

2. The method of claim 1, further comprising:

generating a zipped management protocol-based steam of the contents by zipping the contents; and transmitting the zipped management protocol-based stream of the contents to the client.

3. The method of claim 1, wherein the client further includes a management protocol stream module to accept the encrypted stream from the server, and combine the accepted stream with the management protocol to generate the management protocol-based stream.

4. A system comprising:

receiving a request for contents of a file included on a server;

reading the contents of the file at the server, in response to the request;

means for encrypting the contents of the file included on the server to generate an encrypted stream including the encrypted contents, the server operatively coupled to a client and to further include a management agent to provide the client access to the server via a management protocol, the client to further include an application, wherein the management protocol comprises a JAVA Management Extensions (JMX) protocol;

means for providing the encrypted stream to the management agent;

means for generating a management protocol-based stream of the contents capable of being transmitted from the server to the client; and means for streaming the encrypted stream from the server to the client via the management agent to provide access to the contents of the file for the application of the client, the client to receive the encrypted stream as the management protocol-based stream.

5. The system of claim 4, further comprising:

means for zipping the contents prior to generating a zipped management protocol-based steam of the content; and means for transmitting the zipped management protocol-based stream of the contents to the client.

6. The system of claim 4, wherein the client further includes a management protocol stream module to accept the encrypted stream from the server, and combine the accepted stream with the management protocol to generate the management protocol-based stream.

7. A machine-readable medium comprising instructions which, when executed by a machine, cause a machine to:

receive a request for contents of a file included on a server;

read the contents of the file at the server, in response to the request;

encrypt the contents of the file included on the server to generate an encrypted stream including the encrypted contents, the server operatively coupled to a client and to further include a management agent to provide the client access to the server via a management protocol, the client to further include an application, wherein the management protocol comprises a JAVA Management Extensions (JMX) protocol;

provide the encrypted stream to the management agent;

generate a management protocol-based stream of the contents capable of being transmitted from the server to the client; and stream the encrypted stream from the server to the client via the management agent to provide access to the contents of the file for the application of the client, the client to receive the encrypted stream as the management protocol-based stream.

8. The machine-readable medium of claim 7, which, when executed, cause the machine to:

zip the contents prior to generating a zipped management protocol-based steam of the contents; and transmit the zipped management protocol-based stream of the contents to the client.

9. The machine-readable medium of claim 7, wherein the client further includes a management protocol stream module to accept the encrypted stream from the server, and combine the accepted stream with the management protocol to generate the management protocol-based stream.

* * * * *